(12) United States Patent
Huang et al.

(10) Patent No.: US 8,320,317 B2
(45) Date of Patent: Nov. 27, 2012

(54) RANGING METHOD AND APPARATUS IN WIRELESS COMMUNICATION SYSTEM

(75) Inventors: Jun Huang, Beijing (CN); Hang Li, Beijing (CN); Guanghan Xu, Beijing (CN)

(73) Assignee: Beijing Xinweu Telecom Technology Inc., Beijing (CN)

( * ) Notice: Subject to any disclaimer, the term of this patent is extended or adjusted under 35 U.S.C. 154(b) by 431 days.

(21) Appl. No.: 12/680,668

(22) PCT Filed: Sep. 27, 2008

(86) PCT No.: PCT/CN2008/072577
§ 371 (c)(1),
(2), (4) Date: Mar. 29, 2010

(87) PCT Pub. No.: WO2009/043309
PCT Pub. Date: Apr. 9, 2009

(65) Prior Publication Data
US 2010/0220694 A1 Sep. 2, 2010

(30) Foreign Application Priority Data
Sep. 29, 2007 (CN) .......................... 2007 1 0175387

(51) Int. Cl.
*H04W 4/00* (2009.01)
(52) U.S. Cl. ........ 370/329; 370/338; 370/342; 370/345; 370/508
(58) Field of Classification Search ................. 370/329, 370/338, 342, 345, 508
See application file for complete search history.

(56) References Cited

U.S. PATENT DOCUMENTS

| | | | |
|---|---|---|---|
| 2005/0195791 A1* | 9/2005 | Sung et al. | 370/342 |
| 2005/0286465 A1* | 12/2005 | Zhuang | 370/329 |
| 2007/0202903 A1* | 8/2007 | Ge et al. | 455/502 |
| 2007/0297363 A1* | 12/2007 | Jalil et al. | 370/330 |
| 2008/0305822 A1* | 12/2008 | Li et al. | 455/522 |

FOREIGN PATENT DOCUMENTS

| | | |
|---|---|---|
| CN | 1182990 A | 5/1998 |
| CN | 1522077 A | 8/2004 |
| CN | 1571297 A | 1/2005 |
| CN | 1855765 A | 11/2006 |

* cited by examiner

*Primary Examiner* — Hassan Kizou
*Assistant Examiner* — Toan Nguyen
(74) *Attorney, Agent, or Firm* — Baker & Hostetler LLP

(57) ABSTRACT

The present invention provides a ranging method and apparatus, a frame structure includes one or more downlink service time slots, a guard interval between downlink sub-frame and uplink sub-frame and one or more uplink service time slots, and the method includes calculating start time of the first uplink service time slot, configuring the start time as reference time; generating a ranging signal; subtract a sum of time period needed for sending the ranging signal and reference time delay from the reference time and configure obtained time result as time of starting to send the ranging signal; subtract the length of a special ranging time slot from the reference time and configure obtained time result as time of starting to receive the ranging signal by a BS; receiving and processing the ranging signal. By the method and apparatus, all kinds of interference are minimized and an optimum ranging function is implemented.

17 Claims, 6 Drawing Sheets

RANGING METHOD AND APPARATUS IN WIRELESS COMMUNICATION SYSTEM

CROSS-REFERENCE TO RELATED APPLICATIONS

This application is a National Stage of International Patent Application No. PCT/CN2008/072577, filed on Sep. 27, 2008, which claims priority to foreign Patent Application No. CN 200710175387.4, filed on Sep. 29, 2007.

FIELD OF THE INVENTION

The present invention relates to wireless communication technologies, and more particularly to a ranging method and apparatus in a wireless communication system.

BACKGROUND OF THE INVENTION

In a wireless communication system, e.g. 3G, IEEE802.16d, IEEE802.16e, ranging is needed to maintain the synchronization of uplinks. FIG. 1 is a schematic diagram illustrating a frame structure of IEEE802.16d or IEEE802.16e. As shown in FIG. 1, in a conventional ranging method, uplink ranging and uplink services share the same segment of time slots, but respectively occupy different sub-channels. After study, the inventor finds that the conventional ranging method has the following problems.

Before the ranging is finished, because original synchronization between a base station (BS) and a user terminal (UT) is not so ideal and closed loop power control is not started, the UT usually sends uplink ranging messages by relatively large transmission power, and thus a ranging channel will bring relatively large interference to a service channel. Especially, when a service BS suddenly restarts, all UTs under the service BS will send uplink ranging messages in a short time, and thus numerous ranging signals will bring great interference to the service channel, thereby badly interfering normal communication of the service channel.

FIG. 2 is a schematic diagram illustrating a conventional ranging problem in a wireless communication system. As shown in FIG. 2, a base station A (BS_A) and a base station B (BS_B) are two adjacent co-frequency BSs. There are a terminal 'a' (UT_a) and a terminal 'b' (UT_b) under the BS_A. In the same time slot, the UT_a performs uplink ranging and the UT_b performs uplink service communication. The UT_a does not keep synchronization with the BS_A and has relatively large transmitting power, thus normal uplink services of the UT_b are disturbed badly.

A BS may receive a downlink signal from a remote co-frequency BS sometimes, and the downlink signal may bring interference to ranging signals of the BS. The interference may be very large sometimes and even may result in that UTs under the BS can not access the BS, and thus services of the BS are badly influenced.

Also as shown in FIG. 2, the BS_A and a base station C (BS_C) are two remote co-frequency BSs. If a time period that a downlink signal of the BS_C arrives at the BS_A partly overlaps a time period that a ranging signal of the UT_a arrives at the BS_A, the downlink signal of the BS_C may bring interference to the ranging signal.

SUMMARY OF THE INVENTION

Embodiments of the present invention provide a ranging method and apparatus in a wireless communication system, to solve the above problems in the conventional ranging method.

The embodiments of the present invention provide a ranging method in a wireless communication system, a frame structure of the wireless communication system includes one or more downlink service time slots, a guard interval between a downlink sub-frame and an uplink sub-frame and one or more uplink service time slots, and the method includes:
  calculating a start time of the first uplink service time slot in the frame structure, and configuring the start time as a reference time;
  generating a ranging signal;
  subtracting a sum of a time period needed for sending the ranging signal and a reference time delay from the reference time, and configuring an obtained time result as a time of starting to send the ranging signal by a UT;
  subtracting the length of a special ranging time slot from the reference time, and configuring an obtained time result as a time of starting to receive the ranging signal by a BS; and
  receiving and processing the ranging signal.

The embodiments of the present invention also provide a ranging apparatus in a wireless communication system, a frame structure of the wireless communication system includes one or more downlink service time slots, a guard interval between a downlink sub-frame and an uplink sub-frame and one or more uplink service time slots, and the apparatus includes:
  a sending unit, adapted to calculate a start time of the first uplink service time slot in the frame structure and configure the start time as a reference time; generate a ranging signal; and subtract a sum of a time period needed for sending the ranging signal and a reference time delay from the reference time, and configure an obtained time result as a time of starting to send the ranging signal by a UT; and
  a receiving unit, adapted to subtract the length of a special ranging time slot from the reference time slot, configure an obtained time result as a time of starting to receive the ranging signal, and receive and process the ranging signal.

By using the ranging method and apparatus provided by the embodiments of the present invention, all kinds of interference are minimized, an optimum ranging function is implemented, and the reliability of ranging signals received by the BS is improved.

DETAILED DESCRIPTION OF THE INVENTION

In order to make the purpose, solutions and merits clearer, the present invention will be illustrated hereinafter in detail with reference to the accompanying drawings and specific embodiments. It should be understood that the embodiments described herein are merely used to explain the present invention and are not used to limit the present invention.

Detailed implementation methods of the present invention are described by taking a SCDMA broadband wireless communication system as an example, but the methods of the present invention are not limited to the SCDMA system.

Figure 1:
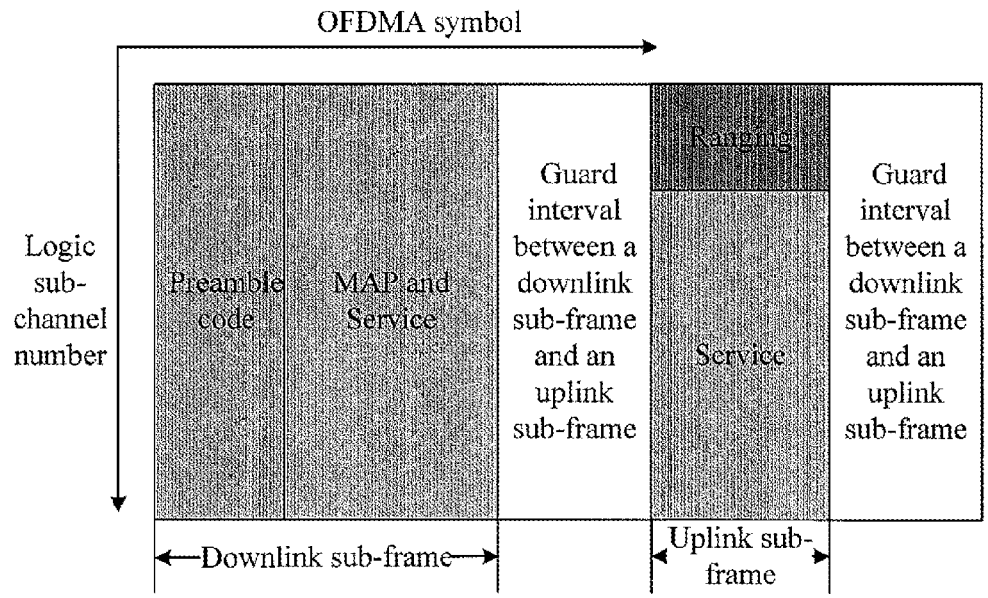
FIG. 1 is a schematic diagram illustrating a frame structure of IEEE802.16d or IEEE802.16e.
Figure 2:
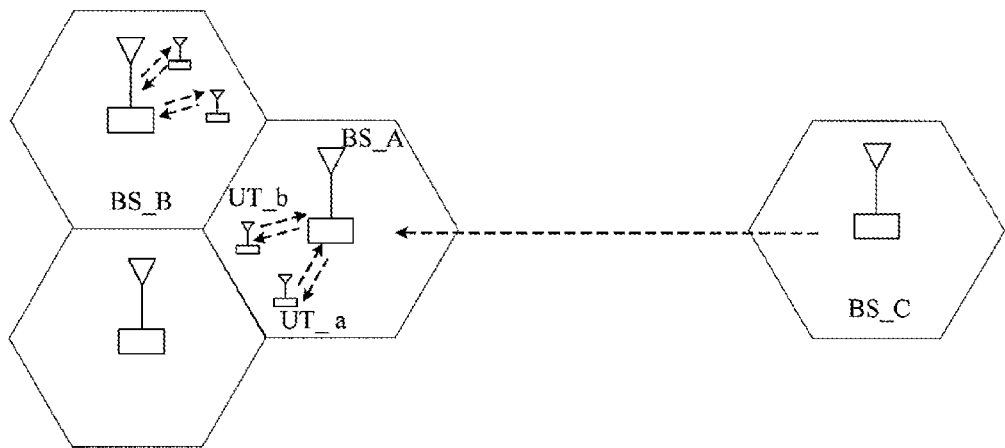
FIG. 2 is a schematic diagram illustrating a conventional ranging problem in a wireless communication system.
Figure 3:
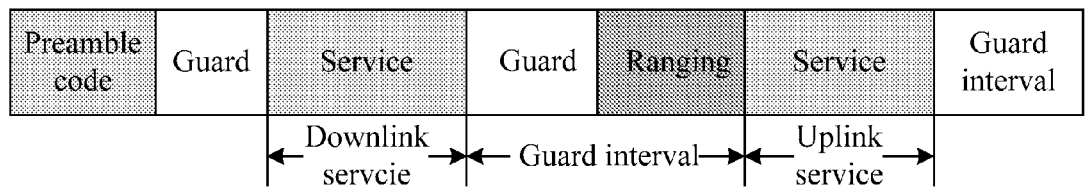
FIG. 3 is a schematic diagram illustrating a frame structure of a Synchronous Code Division Multiple Access (SCDMA) broadband wireless access system according to an embodiment of the present invention.

FIG. 3 is a schematic diagram illustrating a frame structure of a SCDMA broadband wireless access system according to an embodiment of the present invention. As shown in FIG. 3, the frame structure includes: a downlink preamble signal (i.e. preamble code), downlink service time slots, a guard interval between a downlink sub-frame and an uplink sub-frame and uplink service time slots. It should be understood for those skilled in the art that the frame structure may include multiple downlink service time slots and multiple uplink service time slots. In the frame structure of the SCDMA broadband wireless access system shown in FIG. 3, a segment of special ranging time slots between the downlink service and the uplink service is allocated for uplink ranging.

Figure 4:
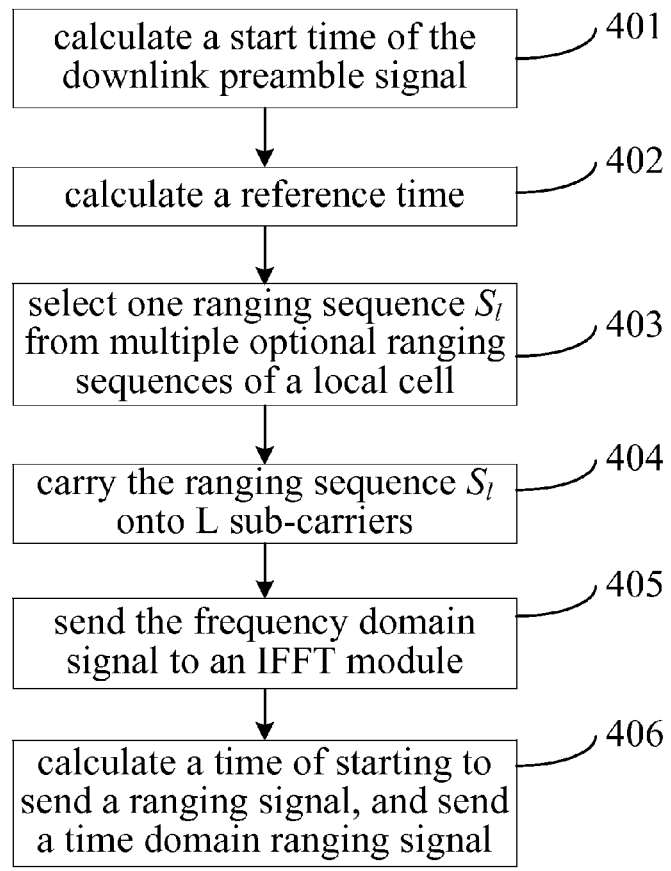
FIG. 4 is a flowchart illustrating a transmitting procedure of a ranging signal in a SCDMA broadband wireless access system according to an embodiment of the present invention.

FIG. 4 is a flowchart illustrating a transmitting procedure of a ranging signal in a SCDMA broadband wireless access system according to an embodiment of the present invention. As shown in FIG. 4, the transmitting procedure of the ranging signal includes the following steps.

Step 401: A UT performs cross-correlation for a received downlink preamble signal and a local preamble signal, and determines a maximum correlation peak value, so as to calculate a supposed start time of the downlink preamble signal, i.e. a start time of the downlink preamble signal.

Step 402: A supposed start time of the first uplink service time slot, i.e. a start time of the first uplink service time slot of a frame where the downlink preamble signal is located, is obtained through the start time of the downlink preamble signal plus the length of the downlink preamble signal plus the length of one or more downlink service time slots plus a guard interval between a downlink sub-frame and an uplink sub-frame, and the start time of the first uplink service time slot is configured as a reference time.

Step 403: One ranging sequence $S_k = (s_0^{[k]}, s_1^{[k]}, \ldots, s_{L-1}^{[k]})$ is randomly selected from $N_{ranging\_sequence}$ optional ranging sequences of a local cell, where $0 \leq k \leq N_{ranging\_sequence} - 1$.

Step 404: The UT carries the ranging sequence $S_k$ onto L sub-carriers in frequency domain to generate a frequency domain signal.

Step 405: The frequency domain signal is sent to an Inverse Fast Fourier Transform (IFFT) module to perform an Inverse Fast Fourier Transform, and a time domain signal T is output as a time domain ranging signal.

Step 406: The UT subtracts a sum of a time period needed for sending a ranging signal and a reference time delay between the UT and the BS from the reference time calculated in Step 402, and configures the obtained time result as a time of starting to send the ranging signal by the UT, i.e. the time domain ranging signal T starts to be sent at this time; the reference time delay is determined according to a loopback distance between the BS and the UT.

Figure 5:
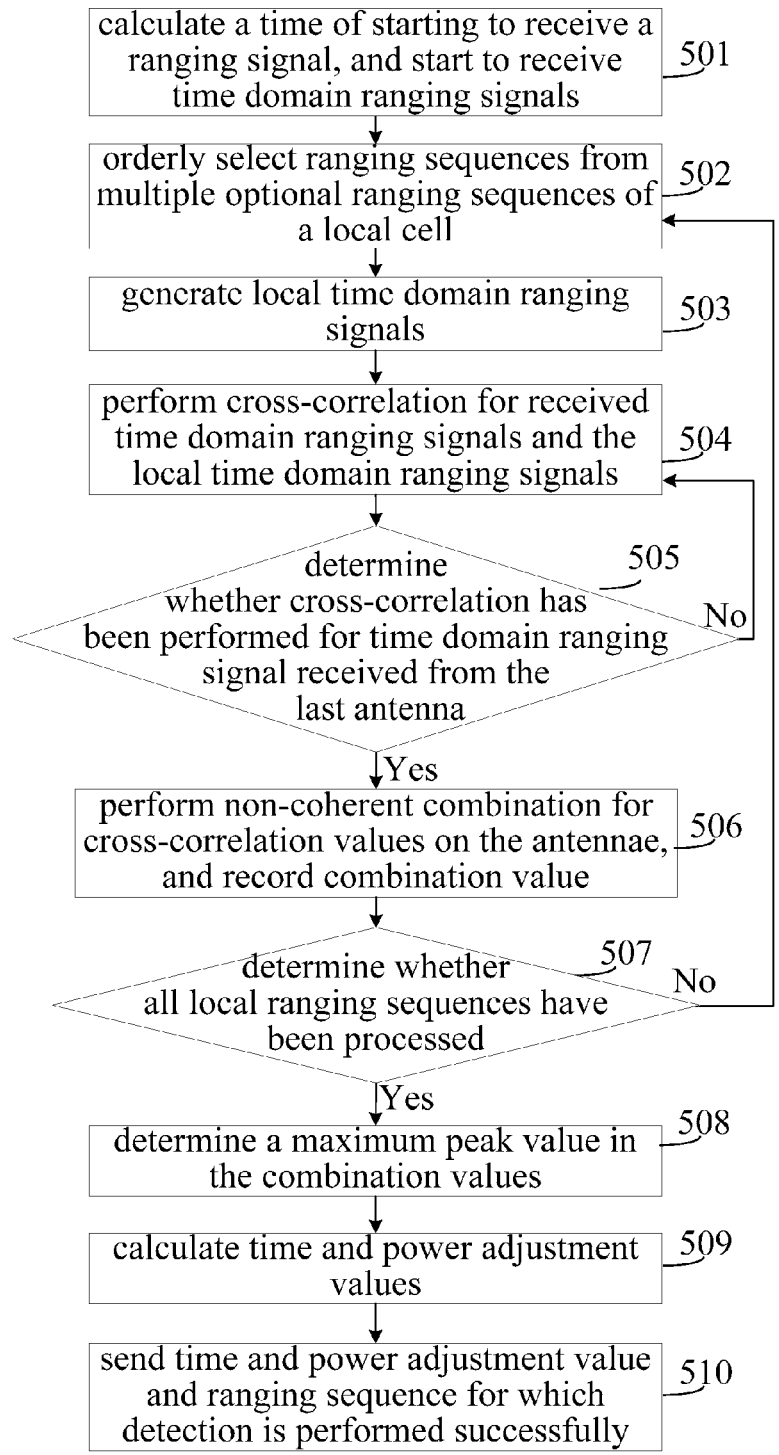
FIG. 5 is a flowchart illustrating a receiving procedure of a ranging signal in a SCDMA broadband wireless access system according to an embodiment of the present invention.

FIG. 5 is a flowchart illustrating a receiving procedure of a ranging signal in a SCDMA broadband wireless access system according to an embodiment of the present invention. As shown in FIG. 5, the receiving procedure of the ranging signal includes the following steps.

Step 501: A BS subtracts the length of a special ranging time slot from a reference time, and configures an obtained time result as a time of starting to receive a ranging signal by; from $N_{antenna}$ antennae of the BS, time domain ranging signals $R_j$ are respectively received, where $j=0, 1, \ldots N_{antenna}-1$; the length of the special ranging time slot is smaller than or equal to the length of a guard interval between a downlink sub-frame and an uplink sub-frame.

Step 502: The BS orderly selects ranging sequences $S_i = (s_0^{[i]}, s_1^{[i]}, \ldots, s_{L-1}^{[i]})$ from $N_{ranging\_sequence}$ optional ranging sequences of a local cell, where $i=0, 1, \ldots N_{ranging\_sequence}-1$ Step 503: $N_{ranging\_sequence}$ local time domain signals $T_i$ are generated as local time domain ranging signals by using the method described in Steps 404 and 405 shown in FIG. 4, where $i=0, 1, \ldots N_{ranging\_sequence}-1$.

Step 504: Starting from the first local time domain ranging signal $T_1$, cross-correlation is performed for the time domain ranging signal $R_j$ received from each antenna and the local time domain ranging signal $$T_1, \text{ i.e. } r_{1j}(m) = \sum_{n=-\infty}^{\infty} R_j^*(n) T_1(n+m),$$

$j=0, 1, \ldots, N_{antenna}-1$.

Step 505: It is determined whether the cross-correlation has been performed for the time domain ranging signal $R_j$ received from the last antenna and the local time domain ranging signal $T_1$; if yes, Step 506 is performed; otherwise, Step 504 is performed.

Step 506: Noncoherent combination is performed for cross-correlation values $r_{1j}$ on the $N_{antenna}$ antennae, and a combination value is recorded, i.e.

$$C_1 = \sum_j |r_{1j}|^2,$$

where $j=0, 1, \ldots, N_{antenna}-1$, and $C_1$ represents a combination value corresponding to the first local time domain ranging signal.

Step 507: It is determined whether all local ranging sequences have been processed; if yes, Step 508 is performed; otherwise, a next local time domain ranging signal is selected, and Steps 504 to 506 are repeated until all combination values $C_i$ are calculated, where $i=0, 1, \ldots N_{ranging\_sequence}-1$.

Step 508: A maximum peak value is determined in the combination values $C_i$ according to a certain signal-to-noise ratio threshold, where $i=0, 1, \ldots N_{ranging\_sequence}-1$.

Step 509: A ranging sequence $S_k$ corresponding to the maximum peak value is determined as a sequence for which detection is performed successfully, and time and power adjustment values of the UT is calculated.

Step 510: The BS sends the time and power adjustment values of the UT and the ranging sequence $S_k$ for which detection is performed successfully through a ranging response channel.

The UT corresponding to the ranging sequence $S_k$ will adjust its own sending time and power according to the received time and power adjustment values, and then may initiate a link establishing request on an uplink access channel.

In a Time Division Duplex (TDD) system, a time delay exists in signal transmission, so a downlink signal of a remote co-frequency BS may bring interference to an uplink signal of this BS. Therefore, a little segment of time slots may be reserved before a special ranging time slot, and is specially used for interference detection of the remote co-frequency BS.

Figure 6:
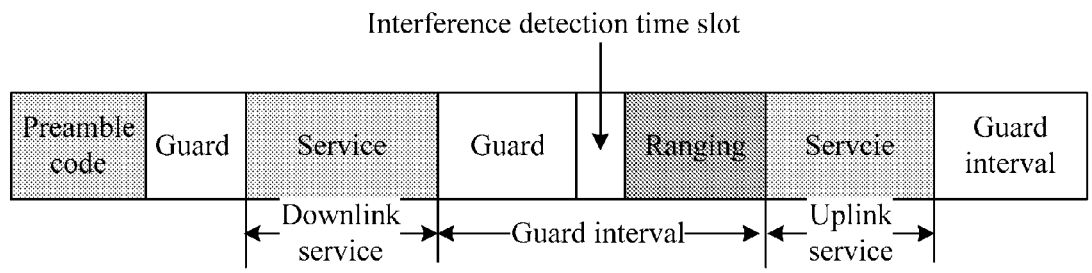
FIG. 6 is a schematic diagram illustrating a frame structure used for interference detection in a SCDMA broadband wireless access system according to an embodiment of the present invention.

FIG. 6 is a schematic diagram illustrating a frame structure used for interference detection in a SCDMA broadband wireless access system according to an embodiment of the present invention. As shown in FIG. 6, there is a special interference detection time slot before a ranging time slot, which is used for interference detection of a remote co-frequency BS. The procedure of the interference detection and the interference cancellation preprocessing is as follows:

(1) A BS detects signals $I=(\vec{I}_1, \vec{I}_2, \ldots, \vec{I}_N)$ on $N_{antenna}$ antennae in an interference detection time slot, where, $\vec{I}_i=(I_i^1, I_i^2, \ldots, I_i^{N_{antenna}})^T$ represents a signal column vector on the $N_{antenna}$ antennae received at the $i^{th}$ sampling point.

(2) A covariance matrix $R_1$ of an interference signal is calculated by using $R_1=I \cdot I^H$, and then a eigenvector matrix M of the interference signal is obtained according to $R_1$.

(3) Interference cancellation preprocessing is performed by using $Y=M \cdot X$, and then an interference cancellation preprocessing ranging signal matrix Y on $N_{antenna}$ antennae is obtained, where X in the formula is a ranging signal matrix $X=(\vec{X}_1, \vec{X}_2, \ldots, \vec{X}_{N_{ranging}})$ received in the special ranging time slot, $N_{ranging}$ represents the length of a ranging signal, and $\vec{X}_i$ represents a signal column vector on $N_{antenna}$ antennae received at the $i^{th}$ sampling point.

Figure 7A:
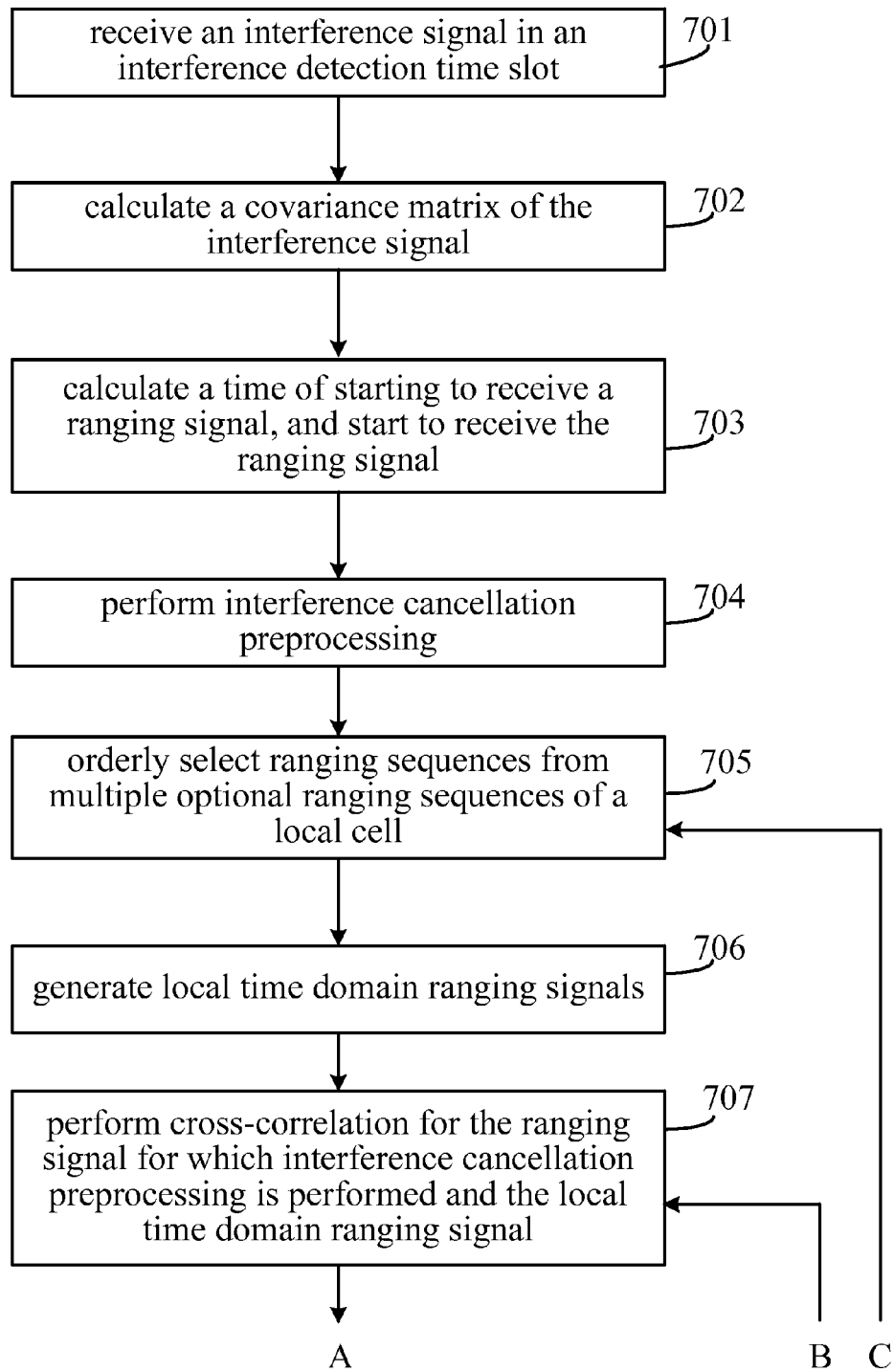
FIG. 7 is a flowchart illustrating a receiving procedure of a ranging signal including interference detection and interference cancellation preprocessing according to an embodiment of the present invention.
Figure 7B:
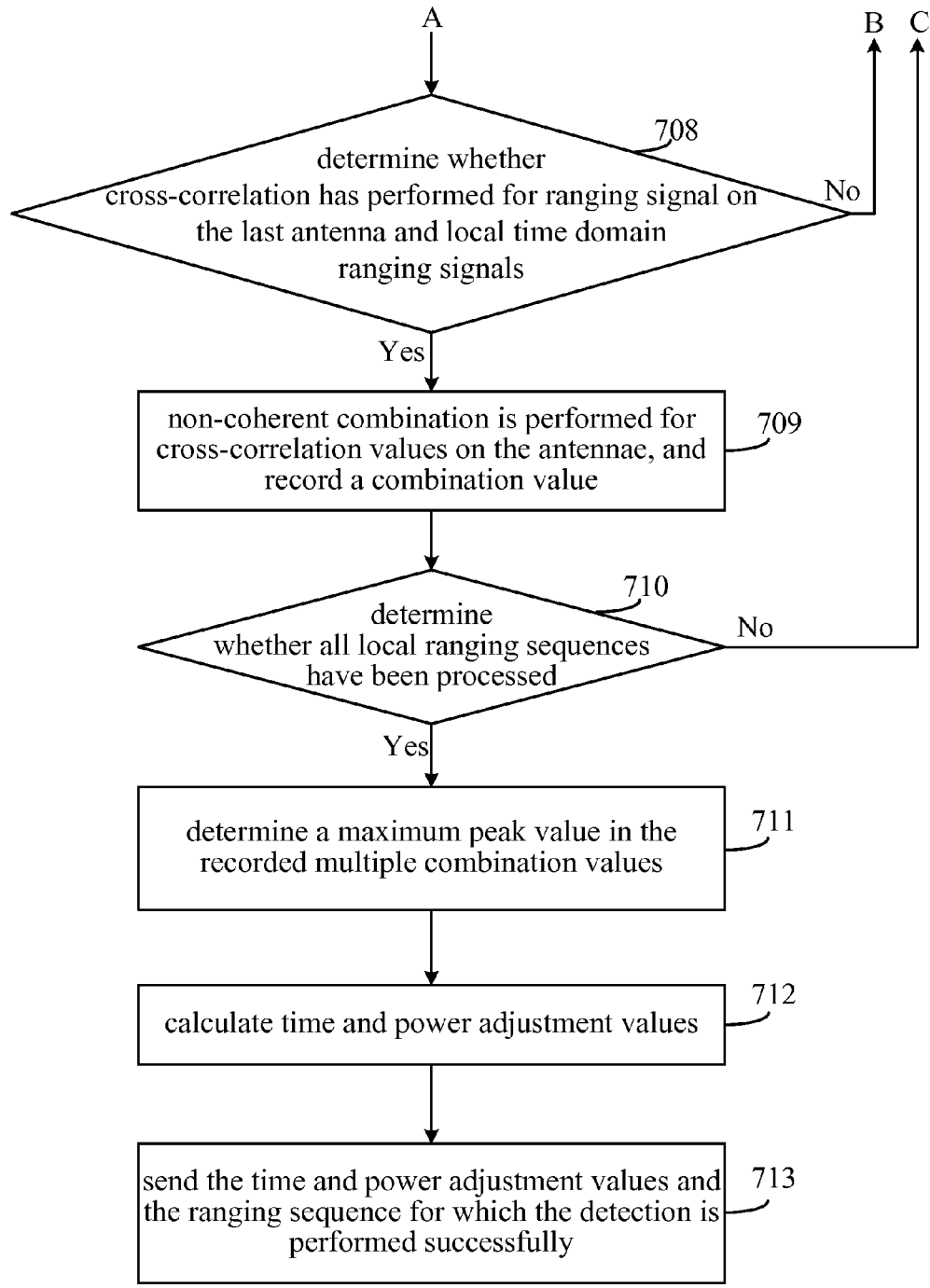

FIG. 7 is a flowchart illustrating a receiving procedure of a ranging signal including interference detection and interference cancellation preprocessing according to an embodiment of the present invention. As shown in FIG. 7, the receiving procedure of a ranging signal including interference detection and interference cancellation preprocessing includes the follows steps.

Step 701: A BS receives an interference signal in an interference detection time slot.

Step 702: A covariance matrix of the interference signal is calculated by using the method described in the above (2).

Step 703: The BS subtracts the length of a special ranging time slot from a reference time and configures the obtained time result as a time of starting to receive a ranging signal; from $N_{antenna}$ antennae of the BS, ranging signals $R_j$ are respectively received, where $j=0, 1, \ldots N_{antenna}-1$.

Step 704: Interference cancellation preprocessing is performed for the ranging signals on the $N_{antenna}$ antennae by using the method described in the above (3), and interference cancellation preprocessing ranging signals on the $N_{antenna}$ antennae are obtained.

Step 705: The BS orderly selects ranging sequences $S_i=(s_0^{[i]}, s_1^{[i]}, \ldots, s_{L-1}^{[i]})$ from $N_{ranging\_sequence}$ optional ranging sequences of a local cell, where $i=0, 1, \ldots N_{ranging\_sequence}-1$.

Step 706: $N_{ranging\_sequence}$ local time domain signals $T_i$ are generated as local time domain ranging signals by using the method described in Steps 404 and 405 shown in FIG. 4, where $i=0, 1, \ldots N_{ranging\_sequence}-1$.

Step 707: Starting from the first local time domain ranging signal $T_1$, cross-correlation is performed for the ranging signal on each antenna for which interference cancellation preprocessing is performed and the local time domain ranging signals.

Step 708: It is determined whether the cross-correlation has performed for the ranging signal on the last antenna for which the interference cancellation preprocessing is performed and the local time domain ranging signals; if yes, Step 709 is performed; otherwise, Step 707 is performed.

Step 709: Noncoherent combination is performed for cross-correlation values on the $N_{antenna}$ antenna, and a combination value is recorded, Step 710: It is determined whether all local ranging sequences have been processed; if yes, Step 711 is performed; otherwise, Step 705 is performed.

Step 711: A maximum peak value is determined in the recorded multiple combination values.

Step 712: A ranging sequence $S_k$ corresponding to the maximum peak value is determined as a ranging sequence for which the detection is performed successfully, and time and power adjustment values of the UT are calculated.

Step 713: The BS sends the time and power adjustment values of the UT and the ranging sequence for which the detection is performed successfully through a ranging response channel.

Figure 8:
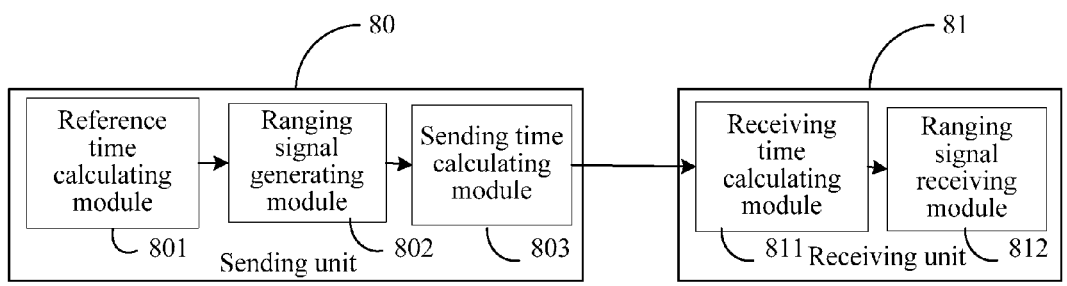
FIG. 8 is a schematic diagram illustrating a structure of a ranging apparatus in a wireless communication system according to an embodiment of the present invention.

An embodiment of the present invention also provides a ranging apparatus in a wireless communication system as shown in FIG. 8. The frame structure of the wireless communication system includes one or more downlink service time slots, a guard interval between a downlink sub-frame and an uplink sub-frame and one or more uplink service time slots. The apparatus includes a sending unit 80 and a receiving unit 81.

The sending unit 80 includes: a reference time calculating module 801, adapted to calculate a supposed start time of the first uplink service time slot, i.e. a start time of the first uplink service time slot in the frame structure, and configure the start time as a reference time; a ranging signal generating module 802, adapted to generating a ranging signal by using a certain method; and a sending time calculating module 803, adapted to subtract a sum of a time period needed for sending the ranging signal and a reference time delay from the reference time, and configure the obtained time result as a time of starting to send the ranging signal by a UT.

The receiving unit 81 includes: a receiving time calculating module 811, adapted to subtract the length of a special ranging time slot from the reference time, and configure the obtained time result as a time of starting to receive the ranging signal; and a ranging signal receiving module 812, adapted to receive and process the ranging signal by using a certain method.

Preferably, the reference time calculating module is adapted to calculate a start time of a downlink preamble signal in the frame structure, obtain a start time of the first uplink service time slot through the start time of the downlink preamble signal plus the length of the downlink preamble signal plus the length of one or more downlink service time slots plus a guard interval between a downlink sub-frame and an uplink sub-frame, and configure the start time of the first uplink service time slot as the reference time.

Preferably, the ranging signal generating module is adapted to randomly select one ranging sequence from multiple optional ranging sequences of a local cell as a current ranging sequence; generate a frequency domain signal by carrying the ranging sequence onto multiple sub-carriers; generate the ranging signal by performing Inverse Fast Fourier Transform for the frequency domain signal.

Preferably, the sending time calculating module is adapted to subtract a sum of a time period needed for sending the ranging signal and the reference time delay between the UT and a BS from the reference time calculated by the reference time calculating module, and configure the obtained time result as a time of starting to send the ranging signal by the UT; the reference time delay is determined according to a loopback distance between the BS and the UT.

Preferably, the length of the special ranging time slot in the receiving time calculating module is smaller than or equal to the length of a guard interval between a downlink sub-frame and an uplink sub-frame.

Preferably, the ranging signal receiving module may perform cross-correlation for each local ranging signal in a group of local ranging signals and the ranging signal received from one or more antennae, and combine cross-correlation values on multiple antennae, i.e. the ranging signal receiving module receives ranging signals on one or more receiving antennae of the BS, orderly selects a ranging sequence from a group of ranging sequences, generates a local ranging signal for each ranging sequence, performs cross-correlation for each local ranging signal and the received ranging signal, combines cross-correlation values on multiple antennae, and generates multiple combination values; determines a ranging sequence corresponding to a maximum peak value in the combination values as a ranging sequence for which the detection is performed successfully, calculates a time and power adjustment value of the UT, and sends the time and power adjustment values to the UT corresponding to the ranging sequence.

Preferably, the ranging signal receiving module may include an interference detection and interference cancellation preprocessing module, adapted to perform interference detection and interference cancellation preprocessing for the ranging signals received from one or more receiving antennae.

Preferably, the interference detection and interference cancellation preprocessing module may reserve an interference detection time slot before the special ranging time slot to perform the interference detection, generate an interference covariance matrix, and perform the interference cancellation preprocessing for the received ranging signal.

It is can be seen from the above embodiments, by using the ranging method and apparatus, all kinds of interference is minimized, and an optimum ranging function is implemented. Since a special time slot between the downlink service time slot and the uplink service time slot is used to send and receive the ranging signal, the interference between the ranging signal and the service signal is avoided. Since the interference detection and interference cancellation preprocessing technologies are used at the same time, the reliability of ranging signals received by the BS is improved.

The foregoing is only preferable embodiments of the present invention and are not used for limiting the protection scope of the present invention. Any modification, equivalent replacement and improvement made within the scope of the present invention should be covered under the protection scope of the present invention.

What is claimed is:

1. A ranging method in a wireless communication system, a frame structure of the wireless communication system comprising one or more downlink service time slots, a guard interval between a downlink sub-frame and an uplink sub-frame and one or more uplink service time slots, and the method comprising:

calculating a start time of the first uplink service time slot in the frame structure, and configuring the start time as a reference time;

generating a ranging signal;

subtracting a sum of a time period needed for sending the ranging signal and a reference time delay from the reference time, and configuring an obtained time result as a time of starting to send the ranging signal by a terminal (UT);

subtracting the length of a special ranging time slot from the reference time, and configuring an obtained time result as a time of starting to receive the ranging signal by a base station (BS); and receiving and processing the ranging signal.

2. The ranging method of claim 1, wherein calculating a start time of the first uplink service time slot in the frame structure comprises:

calculating a start time of a downlink preamble signal in the frame structure;

obtaining the start time of the first uplink service time slot through the start time of the downlink preamble signal plus the length of the downlink preamble signal plus the length of one or more downlink service time slots plus a guard interval between a downlink sub-frame and an uplink sub-frame.

3. The ranging method of claim 1, wherein generating a ranging signal comprises:

randomly selecting one ranging sequence from a group of ranging sequences as a current ranging sequence;

carrying the ranging sequence onto multiple sub-carriers to generate a frequency domain signal; and performing an Inverse Fast Fourier Transform for the frequency domain signal to generate the ranging signal.

4. The ranging method of claim 1, wherein the reference time delay is determined according a loopback distance between the UT and a BS.

5. The ranging method of claim 1, wherein the length of the special ranging time slot is smaller than or equal to the length of the guard interval between a downlink sub-frame and an uplink sub-frame.

6. The ranging method of claim 1, wherein receiving and processing the ranging signal comprises:

receiving the ranging signal from one or more receiving antennae of a BS;

orderly selecting a ranging sequence from a group of ranging sequences, generating a local ranging signal for each ranging sequence, performing cross-correlation for each local ranging signal and the received ranging signal, combining cross-correlation values on the one or more antennae, and generating multiple combination values; and determining a ranging sequence corresponding to a maximum peak value in the combination values as a ranging sequence for which detection is performed successfully, calculating time and power adjustment values of the UT, and sending the time and power adjustment values to the UT corresponding to the ranging sequence.

7. The ranging method of claim 6, further comprising:

performing interference detection and interference cancellation preprocessing for the ranging signal received from the one or more receiving antennae.

8. The ranging method of claim 7, wherein performing the interference detection comprises:

reserving a segment of time slots as an interference detection time slot before the special ranging time slot to perform interference detection, calculating a covariance matrix of interference signals, and performing the interference cancellation preprocessing for the received ranging signal.

9. An ranging apparatus in a wireless communication system, a frame structure of the wireless communication system comprising one or more downlink service time slots, a guard interval between a downlink sub-frame and an uplink sub-frame and one or more uplink service time slots, and the apparatus comprising:

a sending unit, adapted to calculate a start time of the first uplink service time slot in the frame structure and configure the start time as a reference time; generate a ranging signal; and subtract a sum of a time period needed for sending the ranging signal and a reference time delay from the reference time, and configure an obtained time result as a time of starting to send the ranging signal by a terminal (UT); and a receiving unit, adapted to subtract the length of a special ranging time slot from the reference time slot, configure an obtained time result as a time of starting to receive the ranging signal, and receive and process the ranging signal.

10. The ranging apparatus of claim 9, wherein the sending unit comprises:

a reference time calculating module, adapted to calculate the start time of the first uplink service time slot in the frame structure and configure the start time as the reference time;

a ranging signal generating module, adapted to generate the ranging signal; and a sending time calculating module, adapted to subtract a sum of a time period needed for sending the ranging signal and the reference time delay from the reference time, and configure the obtained time result as the time of starting to send the ranging signal by the UT;

the receiving unit comprises:

a receiving time calculating module, adapted to subtract the length of the special ranging time slot from the reference time, and configure the obtained time result as the time of starting to receive the ranging signal by a base station (BS); and a ranging signal receiving module, adapted to receive and process the ranging signal.

11. The ranging apparatus of claim 10, wherein the reference time calculating module is adapted to calculate a start time of a downlink preamble signal in the frame structure, and obtain a start time of the first uplink service time slot through a start time of a downlink preamble signal plus the length of a downlink preamble signal plus the length of the one or more downlink service time slots plus a guard interval between a downlink sub-frame and an uplink sub-frame.

12. The ranging apparatus of claim 10, wherein the ranging signal generating module is adapted to randomly select one ranging sequence from multiple optional ranging sequences as a current ranging sequence; generate a frequency domain signal by carrying the ranging sequence onto multiple sub-carriers; generate the ranging signal by performing Inverse Fast Fourier Transform for the frequency domain signal.

13. The ranging apparatus of claim 10, wherein the sending time calculating module determines the reference time delay according to a loopback distance between the UT and a BS.

14. The ranging apparatus of claim 10, wherein the length of the special ranging time slot in the receiving time calculating module is smaller than or equal to the length of the guard interval between a downlink sub-frame and an uplink sub-frame.

15. The ranging apparatus of claim 10, wherein the ranging signal receiving module is adapted to receive the ranging signal from one or more receiving antennae of the BS; orderly select ranging sequences from a group of ranging sequences; generate a local ranging signal for each ranging sequence; perform cross-correlation for each local ranging signal and the received ranging signal, and combine cross-correlation values on the one or more antennae, generate multiple combination values; determine a ranging sequence corresponding to a maximum peak value in the combination values as a ranging sequence for which detection is performed successfully, calculate a time and power adjustment values of the UT, and send the time and power adjustment values to the UT corresponding to the ranging sequence.

16. The ranging apparatus of claim 10, wherein the ranging signal receiving module is further adapted to perform interference detection and interference cancellation preprocessing for the ranging signal received from one or more receiving antennae.

17. The ranging apparatus of claim 16, wherein the ranging signal receiving module is adapted to reserve a segment of time slots as interference detection time slots before the special ranging time slot to perform interference detection, generate an covariance matrix of interference signals, and perform the interference cancellation preprocessing for the received ranging signal.

* * * * *